United States Patent

Lingwood

Patent Number: 5,649,477
Date of Patent: Jul. 22, 1997

[54] OUTDOOR COOKING DEVICE

[76] Inventor: Anthony Michael Lingwood, 50 Monte de los almendros, Salobrena, Granada, Spain

[21] Appl. No.: 379,559
[22] PCT Filed: May 28, 1993
[86] PCT No.: PCT/GB93/01136
§ 371 Date: Feb. 3, 1995
§ 102(e) Date: Feb. 3, 1995
[87] PCT Pub. No.: WO94/03093
PCT Pub. Date: Feb. 17, 1994

[30] Foreign Application Priority Data

Aug. 7, 1992 [GB] United Kingdom .......... 9216839
Jan. 8, 1993 [GB] United Kingdom .......... 9300249

[51] Int. Cl.⁶ .................................................. A47J 37/07
[52] U.S. Cl. ................................................. 99/446; 99/447
[58] Field of Search .............................. 99/444, 446, 400, 99/425, 447; 126/41 R, 25 R

[56] References Cited

U.S. PATENT DOCUMENTS

| | | | |
|---|---|---|---|
| 3,688,758 | 9/1972 | Stephen, Jr. | 126/41 |
| 3,882,767 | 5/1975 | Oyler | 99/446 |
| 3,989,028 | 11/1976 | Berger | 126/41 |
| 4,454,805 | 6/1984 | Matthews | 99/446 |
| 4,684,867 | 8/1987 | Beatty | 126/41 |
| 4,773,319 | 9/1988 | Holland | 99/446 |
| 4,788,962 | 12/1988 | Mashburn et al. | 126/25 |
| 4,909,137 | 3/1990 | Brugnoli | 99/444 |
| 5,121,676 | 6/1992 | Jurgens | 99/340 |
| 5,129,385 | 7/1992 | Dodgen | 126/25 |
| 5,158,066 | 10/1992 | Dodgen | 126/25 |
| 5,313,877 | 5/1994 | Holland | 99/446 |

FOREIGN PATENT DOCUMENTS

| | | |
|---|---|---|
| 16789/70 | 1/1972 | Australia . |
| 903073 | 2/1985 | Belgium . |
| 3312041A1 | 4/1984 | Germany . |
| 8912697 | 10/1989 | Germany . |
| 3055017 | 8/1991 | Japan . |
| 1187068 | 4/1970 | United Kingdom . |

*Primary Examiner*—David Scherbel
*Assistant Examiner*—Reginald L. Alexander
*Attorney, Agent, or Firm*—Westman, Champlin & Kelly, P.A.

[57] ABSTRACT

An outdoor device cooks food and includes a heat source. A support supports the food to be cooked above the heat source. A baffle is interposed between the heat source and the food support. The baffle is located and shaped so as to both prevent drippings from the food being cooked from falling onto the heat source and collect the drippings together above the heat source. A receptacle is disposed below the heat source and the drippings are channeled from the baffle to the receptacle without contacting the heat source.

20 Claims, 6 Drawing Sheets

FIG. 14

OUTDOOR COOKING DEVICE

BACKGROUND OF THE INVENTION

The present invention relates to outdoor cooking devices.

SUMMARY OF THE INVENTION

In recent times the use of outdoor cooking devices such as barbecues has become increasingly popular. However, one of the problems associated with cooking food on a barbecue is that fat and other drippings falling from the food to be cooked impact upon the heat source and have a tendency to ignite resulting in an uncontrolled flare up that can ruin the food to be cooked.

Another problem particularly associated with gas type barbecues that employ a heat absorbent material such as lava rock, is that the fats and other drippings falling from the food to be cooked collect on the lava rock where they are absorbed so that the lava rock then becomes unsightly. In use the accumulated fats and other drippings absorbed by the lava rock may ignite giving rise to a disproportionately large and unexpected flare-up and when not in use may give rise to stale odours that when the barbecue is first used again after a prolonged period may taint the food to be cooked.

Furthermore, although various devices have been proposed for collecting the fats and other drippings falling from the food to be cooked, because these drippings fall over a relatively large area the collecting receptacles have had a similarly large surface area and so have required considerable cleaning after use. Even so the collection of fats and other drippings for re-use has in the past only been associated with gas type barbecues as it has not been thought appropriate to attempt to recycle fats and other drippings that have come into contact with the charcoal or the other combustable media of traditional barbecues.

It is an object of the present invention to address these problems associated with the prior art.

According to a first aspect of the present invention there is provided an outdoor cooking device comprising a heat source, means for supporting the food to be cooked above the heat source, a baffle interposed between the heat source and said food supporting means, the baffle being located and shaped so as to both prevent drippings from the food being cooked from falling on to said heat source and collect said drippings together above the heat source, a receptacle disposed below the heat source, and means to channel the drippings collected by the baffle to the receptacle without contacting the heat source.

Advantageously the receptacle may be disposable.

Advantageously the heat source may be arranged so as to extend over a predetermined area, said area including a void region comprising a substantially vertical hole through the heat source, said channelling means directing the drippings to the receptacle through said void region.

According to a second aspect of the present invention there is provided an outdoor cooking device comprising a heat source arranged so as to extend over a predetermined area, said area including a void region comprising a substantially vertical hole through the heat source, means for supporting the food to be cooked above the heat source, a baffle interposed between the heat source and said food supporting means, the baffle being located and shaped so as to prevent drippings from the food being cooked from falling on to said heat source, and means to channel the drippings through said void region to a region beneath the heat source.

Advantageously a receptacle may be disposed below said void region. Preferably the receptacle may be disposable.

Advantageously the baffle may be formed integrally with said receptacle. In such an arrangement the baffle may be comprised of two or more components and the component which is formed integrally with the receptacle may be adapted so as to be disposable.

Advantageously the baffle may include an opening and be so shaped that drippings from the food being cooked falling on the baffle are directed toward the opening. Preferably an upper surface of the baffle in a region over which drippings are collected may be inclined upwardly away from said opening at an angle to the horizontal in excess of 30°. Preferably the baffle may be provided with a depending wall surrounding the opening to define a path by which the drippings may be channelled without contacting the heat source. Preferably the path defined by the depending wall may be capable of being closed at an end remote from the opening so as to thereby define a receptacle in which to collect the drippings. Preferably the opening in the baffle may be in vertical alignment with said void region.

Advantageously means may be provided to concentrate the heat generated by said heat source on to a selected region of said food supporting means.

Advantageously the baffle may be comprised of two or more components, at least one of said components being capable of being arranged so as to concentrate the heat generated by the heat source on to a selected region of said food supporting means.

According to a third aspect of the present invention there is provided an outdoor cooking device comprising a heat source and an apertured baffle above the heat source, the baffle being located and shaped so as to concentrate the heat generated by the heat source in the region of the aperture.

Advantageously means may also be provided for supporting the food to be cooked above the baffle and in the region of the aperture.

Advantageously a lower surface of the baffle may be inclined downwardly from the or each aperture provided in the baffle.

According to a fourth aspect of the present invention there is provided an outdoor cooking device comprising two or more independently controllable heat sources, means for supporting the food to be cooked above the heat sources, and a baffle interposed between the heat sources and said food supporting means, the baffle being located and shaped so as to both prevent drippings from the food being cooked from falling on to the heat sources and collect said drippings together above the heat sources, one of said sources being located so as to heat particularly the region of the baffle at which drippings are collected.

Advantageously an upper surface of the baffle may be inclined upwardly and away from the region from which the drippings are collected and the sources may be arranged so as the heat different regions of said upper surface.

Advantageously the baffle may be substantially bowl shaped and the sources arranged substantially coaxially. Preferably the sources may be substantially annular.

According to a fifth aspect of the present invention there is provided an outdoor cooking device comprising a heat source, means for supporting the food to be cooked above the heat source, and a baffle interposed between the heat source and said food supporting means, the baffle being located and shaped so as to both prevent drippings from the food being cooked from falling on to the heat source and collect said drippings together above the heat source, the heat source being moveable between a first position in which the source is capable of heating the food to be cooked and a second position in which in addition the source is capable of particularly heating the region of the baffle at which drippings are collected.

Advantageously means may additionally be provided to controll the quantity of heat generated by the heat source.

Advantageously the heat source may be rotatable between said first and second positions.

Advantageously the heat source may comprise a gas burner.

BRIEF DESCRIPTION OF THE DRAWINGS

A number of embodiments of the present invention will now be described by way of example with reference to the accompanying drawings in which.

DETAILED DESCRIPTION OF THE PREFERRED EMBODIMENTS

Figure 1:
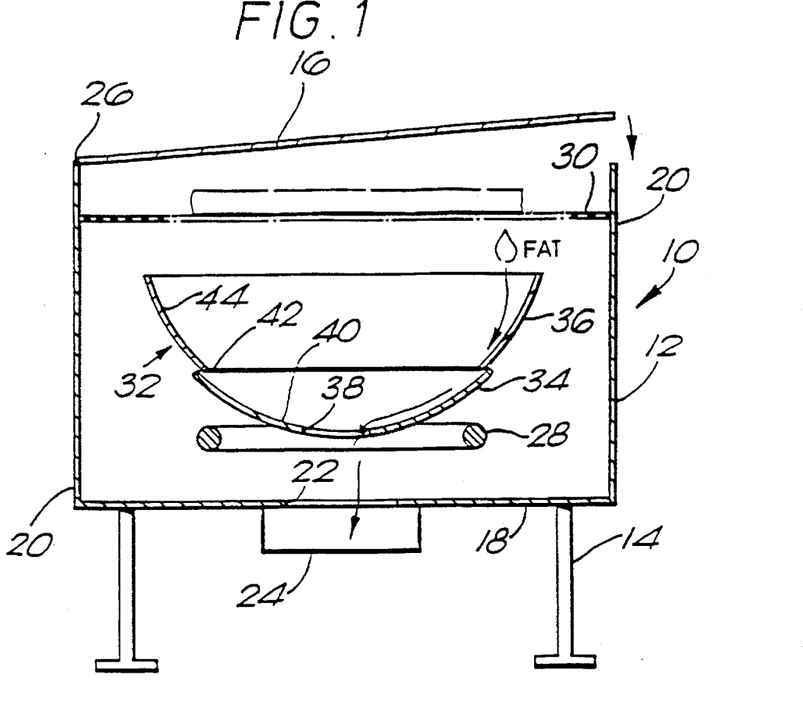
FIG. 1 is a cross-sectional view of a cooking device in accordance with a first embodiment of the present invention.

Referring to FIG. 1 there is shown a cooking device 10 comprising a cooking vessel or chamber 12 mounted on a supporting structure 14 and closed by a cover 16.

As can be seen, the chamber 12 comprises a base 18 and side-walls 20, the base 18 being provided with a central aperture 22 below which there is releasably mounted a collecting receptacle 24. By contrast the side-walls 20 are provided at a location remote from the base 18 with one or more hinges 26 with which to pivotally mount the cover 16 with respect to the chamber 12. In an alternative arrangement the cover 16 may simply rest on projections provided on the side walls 20 so as to be capable of being lifted off to give access to the chamber 12.

Within the chamber 12 there is disposed a heat source 28 which, in the example shown in FIG. 1, takes the form of an annular gas burner having ignitable gas jets disposed at intervals around its perimeter. Above this heat source 28 there is disposed a wire grill, griddle or other cooking device 30 which is capable of supporting the food to be cooked. Finally, between the heat source 28 and the griddle 30 there is disposed a baffle 32.

As can be seen from FIG. 1, the baffle 32 is substantially bowl-shaped and comprises inner and outer portions 34 and 36. Of these two portions, the inner baffle portion 34 is of arcuate cross-section and provided with a central opening 38 such that an upper surface 40 of the inner baffle portion 34 curves smoothly upwardly and away from the central opening 38. Similarly, the outer baffle portion 36, which, when viewed from above, is substantially annular in shape, is also provided with a central opening 42. This opening 42 is so sized that when the outer baffle portion 36 is placed adjacent the inner baffle portion 34 the central opening 42 is completely closed by the inner baffle portion 34 (apart of course from the central opening 38) and results in a slight overlapping of the two baffle portions 34 and 36.

Like the inner baffle portion 34, the outer baffle portion 36 is also of arcuate cross-section so that when in this juxtaposed position an upper surface 44 of the outer baffle portion 36 curves smoothly upwardly and away from the central opening 38.

In use the baffle 32 is arranged with respect to the chamber 12 so that the central opening 38 of the inner baffle portion 34 is in vertical alignment with the central aperture 22 of the base 18. Thereafter the gas-burners of the heat source 28 are lit, the food to be cooked placed on the wire-grill 30 and the chamber 12 closed by the cover 16.

As the food is being cooked, fat and other drippings fall from the food on to the baffle 32 whereupon they begin to drain under the influence of gravity toward the central opening 38. Because by this time the baffle 32 will have been heated by the heat source 28, some of the fat and other drippings falling from the food will be vapourised thereby imparting to the food the desired barbecue flavour. However the fat and other drippings remaining on the baffle 32 are channelled to the central opening 38 whereupon they pass, again under the influence of gravity, through the central void region of the annular heat source 28, through the central aperture 22 and into the collecting receptacle 24. In this way it is possible to avoid the occurrence of flare ups since at no time does the fat or other drippings falling from the food come into contact with the heat source 28. By the same token, in the case of a heat source in the form of a gas burner, it is possible to prevent falling fat or other drippings from clogging or otherwise occluding the jets of the gas burner.

When fat or other drippings fall on to an inclined surface the effect of gravity is to cause the fat or other drippings to drain down a line of slope of the surface. If the inclined surface is heated however a number of separate mechanisms also come into play. Thus, whilst it might be expected that as fat is heated it becomes less viscous and so drains more quickly, the reverse is often the case. This situation arises because as the temperature is increased there is a tendency for particles within the fat or other drippings to burn and stick to the surface. This, together with the increased liklihood of bits of food falling on to the surface, tends to decrease the speed with which the fat or other drippings drain away.

In previous barbecues, the inability of fat or other drippings to drain sufficiently quickly from hot surfaces has led to two separate problems. Firstly, it has resulted in the build up of fat or other drippings on the surface concerned which has proved difficult to remove by cleaning and which, if left, increases the risk of a disproportionately large and unexepcted flare-up. Secondly, it has led to the generation of noxious vapours that have a tendency to taint the food to be cooked. The second of these problems occurs as a result of prolonged heating of the fat or other drippings. Thus whilst the initial vapourisation of the fat or other drippings falling from the food to be cooked is to be encouraged in that it imparts to the food the desired barbecue flavour, the prolonged over heating of the fat or other drippings is not.

In the cooking device shown in FIG. 1 it will be apparent that because of the positioning of the heat source 28 with respect to the baffle 32, the outer baffle portion 36 will, in use, reach a higher temperature than will the inner baffle portion 34. As a result the problem associated with the prolonged over heating of fat or other drippings might be thought to reach a maximum within this region. However, it is precisely this portion of the baffle that is provided with the greatest angle of inclination. By ensuring that those regions of the baffle which, in use, are heated to a temperature sufficient to cause vapourisation of some of the fat or other drippings with which they come into contact are also inclined at an angle to the horizontal in excess of 30° it is possible to ensure that the fat or other drippings will drain sufficiently quickly so as not to be over heated and give rise to noxious vapours. Preferably these regions of the baffle are inclined at an angle to the horizontal within the range from 30° to 70°. In this way it is possible to ensure that the majority of the fat or other drippings falling on to the baffle 32 will drain to the central opening 38 while at the same time ensuring that a sufficient quantity is vapourised to impart the desired barbecue flavour to the food to be cooked The optimum angle of inclination of the baffle 32 will vary depending on the purpose for which the cooking device is employed. For example, a dedicated meat roasting oven which would be operated at relatively low temperatures would benefit from a low angle of inclination of the baffle 32 as this would increase the exposure of the lower portions of a roasting joint to the heat radiated from the baffle resulting in all over browning and more even cooking, in effect offering the advantages normally associated with a rotissary. At roasting temperatures very little of the fat or other drippings will be vapourised and even at an inclination as low 30° most of the fat and juices will run off the baffle for collection and/or disposal. At the other end of the scale, a dedicated barbecue which is normally operated at high temperatures might employ a baffle 32 inclined at 60° or more to the horizontal to ensure that the fat or other drippings that does not vapourise on contact with the baffle is encouraged to pass quickly over the surface of the baffle for collection thus minimising the possibility of flare-ups and the generation of noxious vapours.

It has been found that satisfactory results for a general purpose cooking device are achieved with an angle of inclination of approximately 45°. However, the optimum angle cannot be closely defined except when other variables are known. With an enclosed cooking container such as a covered barbecue the food will be cooked with a combination of radiant heat and convected heat. If it is desired to have a lesser proportion of radiant heat and a greater proportion of convected heat then the relatively low baffle temperature will usually permit a shallow baffle inclination to be used. However, if the food is positioned at a greater distance from the baffle 32 then the baffle will need to be heated more to produce the same amount of radiant heat and will therefore need to be more steeply inclined. In an open topped barbecue where only radiant heat is available the baffle temperature will always be high and will therefore require higher angles of inclination to minimise flare-ups and the generation of noxious vapours.

It will be apparent to those skilled in the art that because of the shape of the baffle 32, the fat and other drippings falling from the food are collected together above the heat source 28 as a result of being directed to the central opening 38. This means that the collecting receptacle 24 may be of a relatively small cross-sectional area thereby reducing the work involved in its cleaning while the baffle 32, being located above the heat source 28, possesses certain inherent self-cleaning properties since any fat or other drippings remaining thereon will be vapourised thereby adding to the flavour of the food.

In order to provide a more thorough cleaning of the baffle 32, once the food has been cooked any excess fat or other drippings on the baffle 32 may be scraped off with a suitable implement and the heat generated by the heat source 28 increased so as to ensure the vapourisation of any remaining fat or other drippings.

In a preferred method of cleaning the two baffle portions 34 and 36 may be inverted and placed on top of the wire-grill 30 with the inner baffle portion 34 received between the wire-grill 30 and the outer baffle portion 36. In this arrangement the increased heat generated by the heat source 28 is directed on to the wire-grill 30 in addition to the baffle portions 34 and 36 causing any fats or other drippings remaining on the wire-grill 30 also be vapourised. Thus it will be apparent that since the collecting receptacle 24 may be removed for cleaning, the described embodiment provides a cooking devices whose components need not with use become impregnated with fat or other drippings.

It will also be apparent to those skilled in the art that the described embodiment provides a cooking device in which it is possible to collect any fats or other drippings sufficiently cleanly to contemplate their re-use.

Clearly whether or not the fat or other drippings are to be re-used, the collecting receptacle 24 may be adapted so as to be disposable.

The foregoing advantages arise as a result of interposing a baffle 32 between the heat source 28 and the food to be cooked. Whilst such an arrangement might be expected to have a dilaterious effect on the ability of the heat source 28 to heat the food sufficiently in order to cook it, this has not been found to be the case. In the case of the cooking device shown in FIG. 1, hot air flows from the heat source 28 to the food to be cooked around the perimeter of the baffle 32 while the hot baffle itself provides a significant amount of radiant heat.

Again, because of the positioning of the heat source 28 with respect to the baffle 32, an annular region of the outer baffle portion 36 remote from the central opening 38 will, in use, reach a higher temperature and so radiate a greater quantity than, say, an annular region of the inner baffle portion 34 adjacent the central opening 38. However, because of the shape of the baffle 42 and the larger diameter of this hotter annular region when compared to that adjacent the central opening 38, the overall effect is to provide a substantially uniform radiative heating over the whole of the wire-grill 30. In this way the baffle 32 serves to prevent the creation of hot spots that might otherwise result in uneven heating of the food to be cooked.

An additional advantage of interposing a baffle 32 between the heat source 28 and the food to be cooked is that in a closed chamber 12, i.e. with the cover 16 down, the baffle 32 is capable of deflecting the heat from the heat source 32 in order to provide an indirect or convected heating. In this way the barbecue described may perform many of the functions of a conventional oven in terms of the baking or roasting of food while at the same time imparting a genuine barbecue flavour.

It will be apparent to those skilled in the art that whilst the baffle 32 has been described as a two part structure comprising inner and outer baffle portions 34 and 36, this need not necessarily be the case. Indeed the baffle 32 may equally be of a one or multi-piece construction. However, one advantage of the two piece construction described is that the outer baffle portion 36 may be inverted with respect to the inner baffle portion 34 to enable the flow of hot air to be concentrated on a particular region of a griddle 30. In this way it is possible for the device described to perform other types of cooking operation normally associated with the application of a direct flame close to the underside of the cooking surface. Under such circumstances the chamber 12 need not necessarily be closed by the cover 16.

Figure 2:
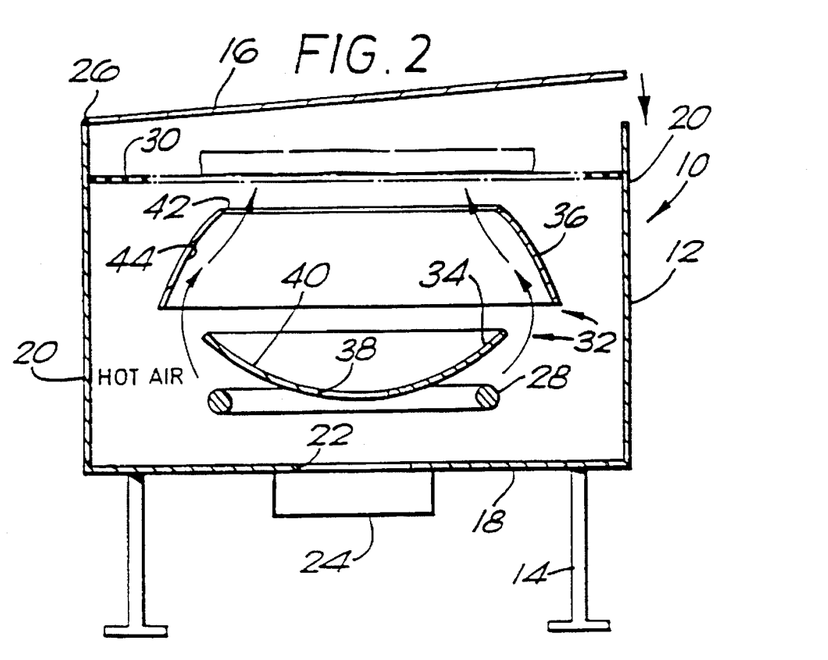
FIG. 2 is a cross-sectional view of the cooking device of FIG. 1 with the baffle configured so as to concentrate the heat generated by the heat source on to a central region of the wire-grill.

FIG. 2 illustrates this alternative mode of operation with the outer baffle portion 36 inverted with respect to the inner baffle portion 34 so as to thereby concentrate the air flow from the heat source 28 on to a central region of a griddle 30. As stated previously, in this arrangement the device may be used in conjunction with pots and pans and other cooking implements that would otherwise require direct contact with a heat source such as a flame or electric hob. In this way the outdoor cooking device may be used in a still wider range of cooking operations.

Figure 3:
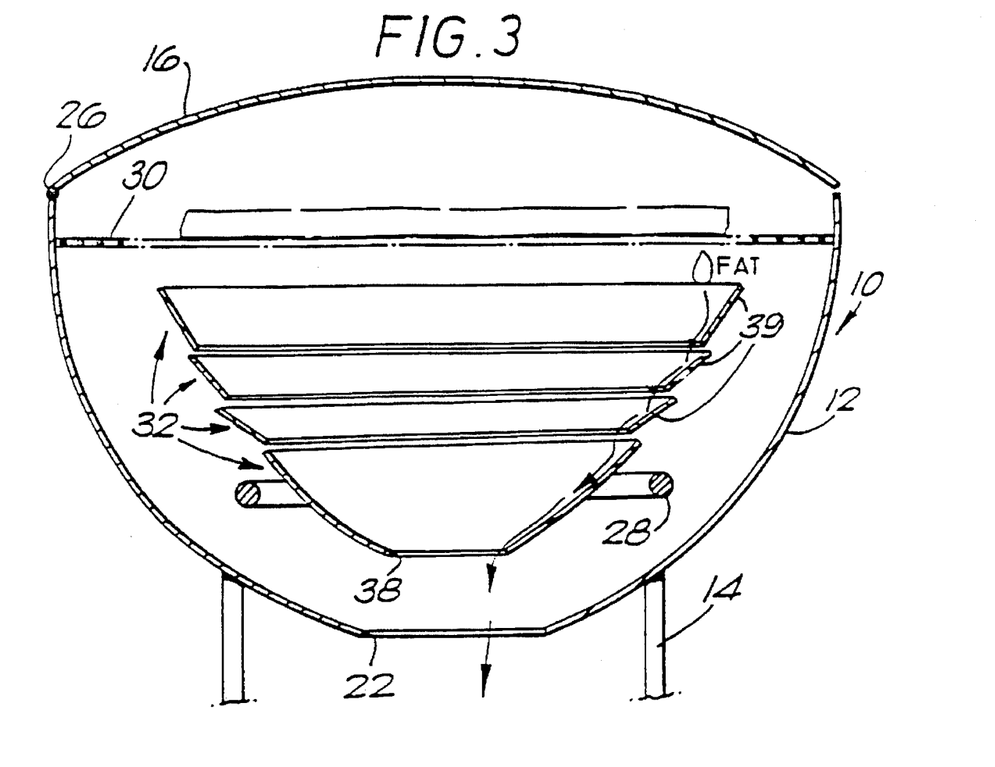
FIG. 3 is a cross-sectional view of a cooking device in accordance with a second embodiment of the present invention.

An example of a multi-piece baffle construction is shown in FIG. 3 in which the baffle 32 is formed of a plurality of concentric inclined annular surfaces 39 each having a different diameter and being arranged so as to partially overlie the inner of its two adjacent surfaces.

Figure 8:
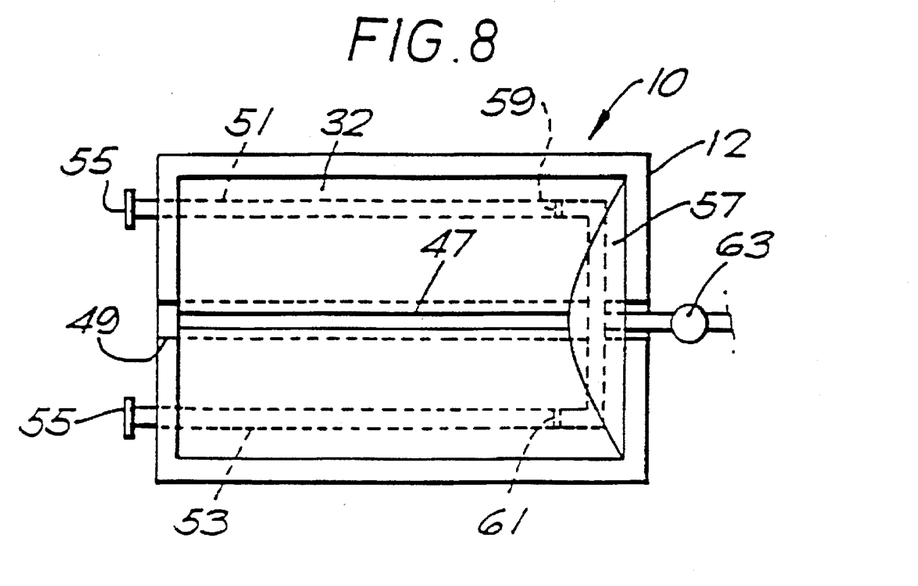
FIG. 8 is a plan-view of a cooking device in accordance with a seventh embodiment of the present invention.

In a similar arrangement having the same cross-section but where instead of being annular the inclined slatted surfaces 39 extend longitudinally either side of a central slot 47 similar to that shown, for example, in FIG. 8, each of the inclined surfaces 39 may be provided with means whereby they may be titled with respect to its neighbours. In this way it is possible to control the speed with which fat or other drippings falling on to the surfaces drain towards the central slot 47. This in turn provides a way of controlling the quantity of fat or other drippings that is vapourised and with it the amount of barbecue flavour that is imparted to the food to be cooked.

Figure 4:
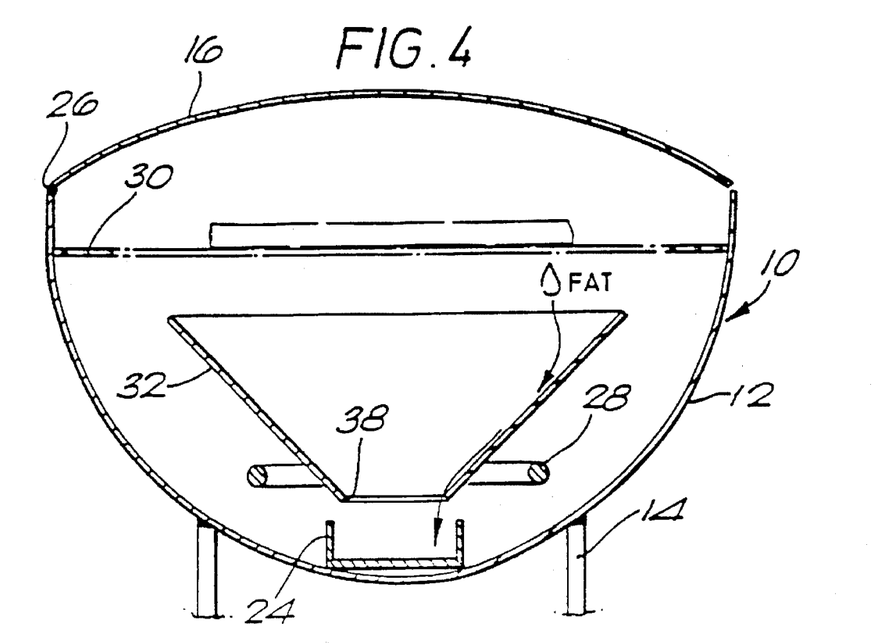
FIG. 4 is a cross-sectional view of a cooking device in accordance with a third embodiment of the present invention.
Figure 5:
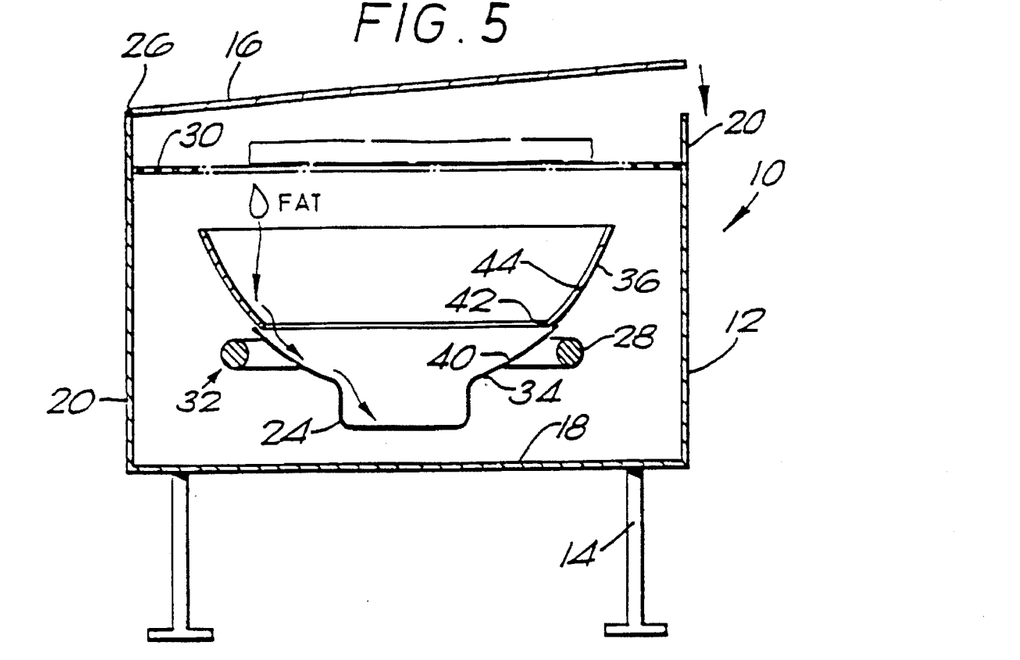
FIG. 5 is a cross-sectional view of a cooking device in accordance with a fourth embodiment of the present invention.

By contrast, an example of a one-piece baffle construction is shown in FIG. 4. In this arrangement it is to be noted that, depending on the positioning of the heat source 28 with respect to the baffle 32, the temperature adjacent the central opening 38 may, in use, be sufficiently cool to enable the collecting receptacle 24 to be located within the chamber 12. Indeed, under such circumstances the baffle 32 may be formed integrally with the collecting receptacle 24 or, returning for a moment to a two-piece construction, the collecting receptacle 24 may be formed integrally with the inner baffle portion 34. One such arrangement is shown in FIG. 5 where the inner baffle portion 34 is formed of a metallic foil and so having served to collect the fat or other drippings may be discarded and replaced with a fresh metallic foil.

Figure 6:
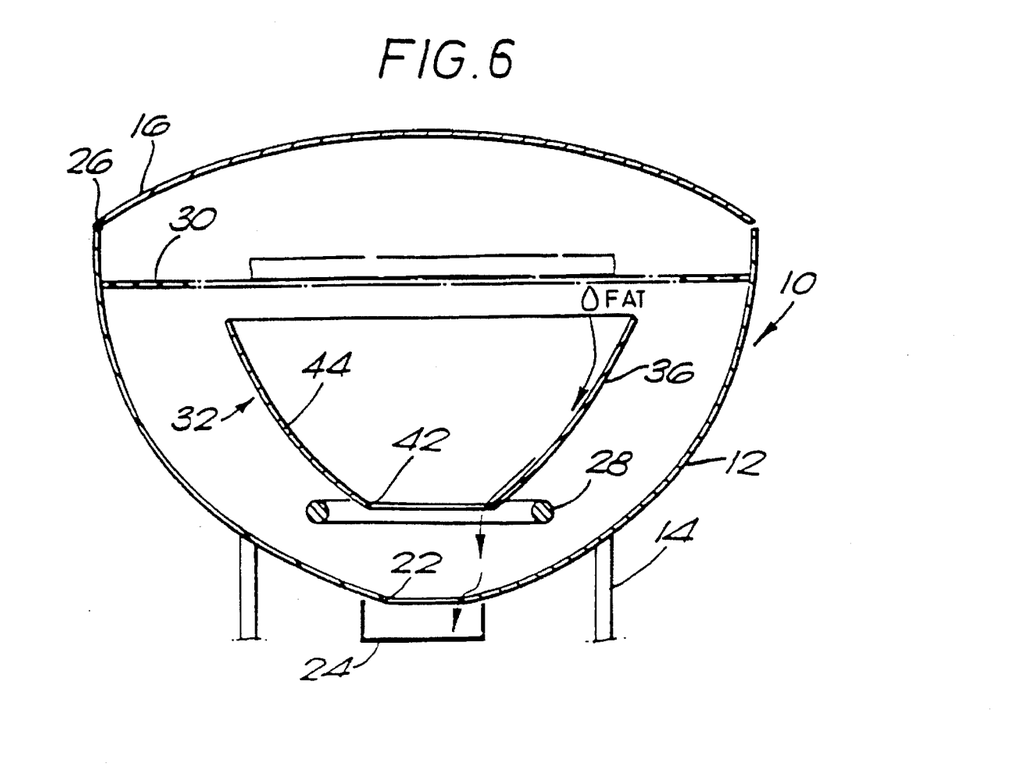
FIG. 6 is a cross-sectional view of a cooking device in accordance with a fifth embodiment of the present invention.

Another one-piece baffle is shown in FIG. 6 where the lower baffle portion 34 has been ommitted completely. In its place the base of the chamber 18 is shaped so as to guide any fat or other drippings falling from the outer baffle portion 36 toward a collecting receptacle 24. Whilst such an arrangement would clearly necessitate the cleaning of that portion of the base 18 adjacent the collecting receptacle 24, this could be facilitated by covering the base with a disposable liner prior to use.

In all the foregoing embodiments it will be apparent to those skilled in the art that the or each portion of the baffle 32 need not be of arcuate cross-section. Instead the sides of the baffle 32 may be substantially rectilinear in cross-section and so give rise to a baffle of substantially frustro-conical shape. An example of one such arrangement is shown in FIG. 4.

Likewise, it will be apparent that the baffle 32 need not be substantially bowl shaped. Instead the baffle may comprise two or more mutually inclined surfaces, as for example shown in FIG. 8, in which the surfaces are inclined upwardly and away from a central opening or slot. One advantage of a baffle having sides which are inclined upwardly and away from an opening is that this shape increases the space that is available for cooking within a given volume of cooking device and so allows the use of a multiplicity of wire grills 30 each disposed at a different height above the baffle.

It will also be apparent to those skilled in the art that whilst the heat source 28 has been described as comprising an annular gas burner this need not necessarily be the case. Indeed the heat source may be of any convenient shape and may alternatively comprise one or more electrical radiative heating elements. In one particular arrangement the baffle may comprise the upper surface of a ceramic bowl shaped member in which the bowl shaped member has embedded in it one or more electrical radiative heating elements.

Figure 7:
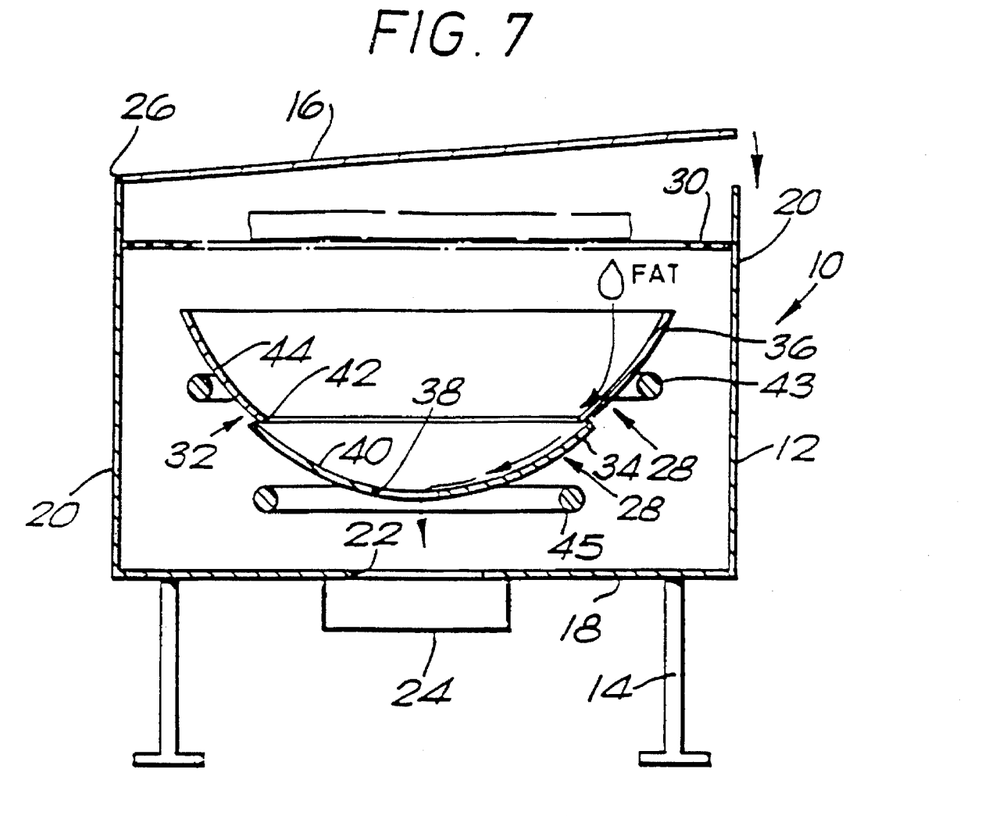
FIG. 7 is a cross-sectional view of a cooking device in accordance with a sixth embodiment of the present invention.

In the embodiment shown in FIG. 7 the cooking device is provided with a heat source 28 comprising two coaxial annular gas burners 43 and 45, each having a plurality of ignitable gas jets disposed at intervals around their perimeter. By providing separate means to control the heat generated by the two gas burners 43 and 45 it is possible to control the temperature of different regions of the baffle and thus the quantity of the fat and other drippings that is vapourised. This in turn enables the control of the amount of barbecue flavour that is imparted to the food. Thus for example, by adjusting the heat generated by the outer of the two gas burners 43 to an amount sufficient to cook the food placed on the wire-grill 30 and by setting the heat generated by the inner of the two gas burners 45 to a minimum it is possible to cook the food so that it has only a slight barbecue flavour. Conversely, if the heat generated by the inner gas burner 45 were to be increased a greater amount of the fat and other drippings falling from the food would then be vapoursied thereby providing the food with a more pronounced barbecue flavour.

Figure 9:
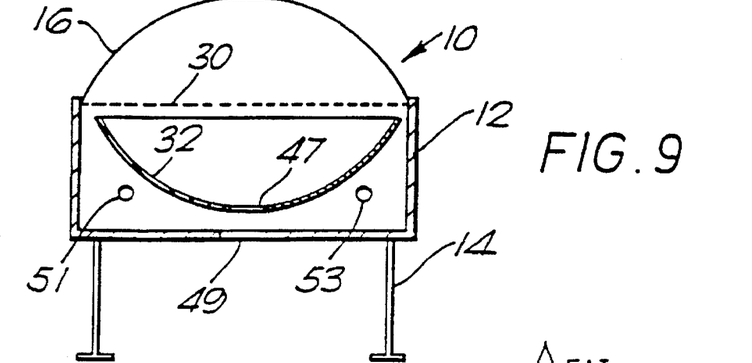
FIG. 9 is a cross-sectional view of the cooking device of FIG. 8.
Figure 10:
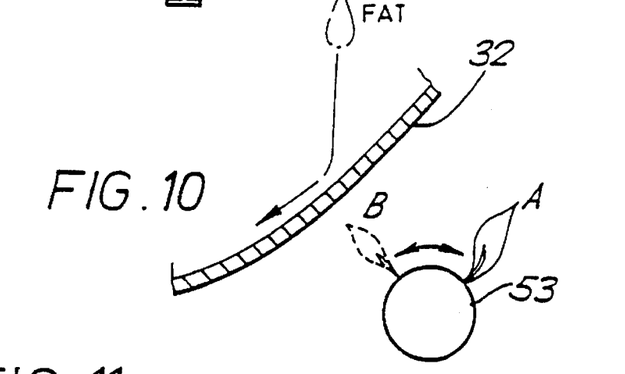
FIG. 10 is an enlarged cross-sectional view of the cooking device of FIG. 8 showing the extreme positions between which the gas burners may be rotated.

In a further embodiment shown in FIGS. 8 to 10 the illustrated cooking device is provided with an alternative means of controlling the amount of barbecue flavour that is imparted to the food to be cooked. As in the previous embodiments the cooking device comprises a chamber 12 mounted on a supporting structure 14 and closed by a cover 16. The chamber 12 which, in the example shown, is substantially rectangular in shape, is provided with a heat source 28, a wire-grill 30 for supporting the food to be cooked and a baffle 32. As before the baffle 32 is of substantially arcuate cross-section and is interposed between the heat source 28 and the wire-grill 30. However in contrast to the previous embodiments, instead of having a circular opening 38, the baffle 32, which when viewed from above is substantially rectangular in shape, is provided with an elongate slot 47 which runs along the centre of the baffle 32 and which is in vertical alignment with a similar elongate slot 49 provided in the base of the chamber 18.

As can be seen from FIG. 8, the heat source 28 comprises two elongate gas burners 51 and 53 which extend along opposite sides of the baffle 32 and which are provided at intervals along their length with a plurality of ignitable gas jets. The two gas burners 51 and 53 are each provided at one end with a respective hand grip 55 while at the other end they are each connected to opposite ends of a T-piece 57 by means of respective swivel joints 59 and 61. The T-piece 57 is in turn connected to a supply of ignitable gas by means of a variable control 63.

In use the food to be cooked is placed on the wire-grill 30 and the gas burners 51 and 53 are lit. As the food is being cooked, fat and other drippings fall from the food on to the baffle 32 whereupon they begin to drain under the influence of gravity toward the central elongate slot 47. As before, some of the fat and other drippings falling from the food will be vapourised upon contacting the heated baffle 32 thereby imparting to the food a degree of barbecue flavour. At the same time the fat and other drippings which are not vapourised are channelled toward the central slot 47 whereupon they pass, under the influence of gravity, through the elongate slot 49 provided in the base of the chamber 18 and away from the heat source 28.

Because the two gas burners 51 and 53 are connected to the T-piece 57 by means of respective swivel joints 59 and 61 the gas burners may be rotated by means of their respective hand grips 55 between the positions A and B shown in FIG. 10. In this way it is possible to vary the degree to which the baffle 32 is heated which in turn provides a means of controlling the quantity of fat and other drippings which are vapourised. Thus for example, by rotating the two gas burners to position A and appropriately adjusting the variable control 63 the heat source 28 may provide a sufficient amount of heat to cook the food placed on the wire-grill 30 without at the same time causing much of the fat and other drippings falling from the food to be vapourised. Consequently with the gas burners 51 and 53 in this position only a small amount of barbecue flavour will be imparted to the food. By contrast, if the gas burners 51 and 53 are rotated to position B in FIG. 10, the regions of the baffle 32 adjacent the two gas burners 51 and 53 will be heated in such away as to cause a greater proportion of the fat and other drippings falling from the food to be vapourised. Thus with the gas burners in position B a more pronounced barbecue flavour will be imparted to the food being cooked.

Clearly the gas burners may be rotated to any desired position between the extremes represented by positions A and B thereby providing the user of the cooking device with a means of controlling the quantity of barbecue flavour that is imparted to the food being cooked.

Whilst the present invention has been described with reference to a gas type heat source or those comprising one or more electrical radiant heating elements, it will be apparent to those skilled in the art that the present invention is equally applicable to traditional charcoal type barbecues. One such barbecue is shown in FIG. 11 to again comprise a cooking vessel or chamber 12 having a base 18 and side-walls 20. As before, a central aperture 22 is provided in the base 18 below which there is releasably mounted a collecting receptacle 24. Mounted on the base 18 and surrounding the central aperture 22 there is provided a retaining wall 46 which, with the base 18 and side-walls 20, defines a region for the confinement of the charcoal or other combustable medium to be used as a heat source 28. To this end the retaining wall 46 is of a sufficient height to prevent the charcoal or other combustable medium from encroaching upon the central aperture 22 and falling into the collecting receptacle 24.

Figure 11:
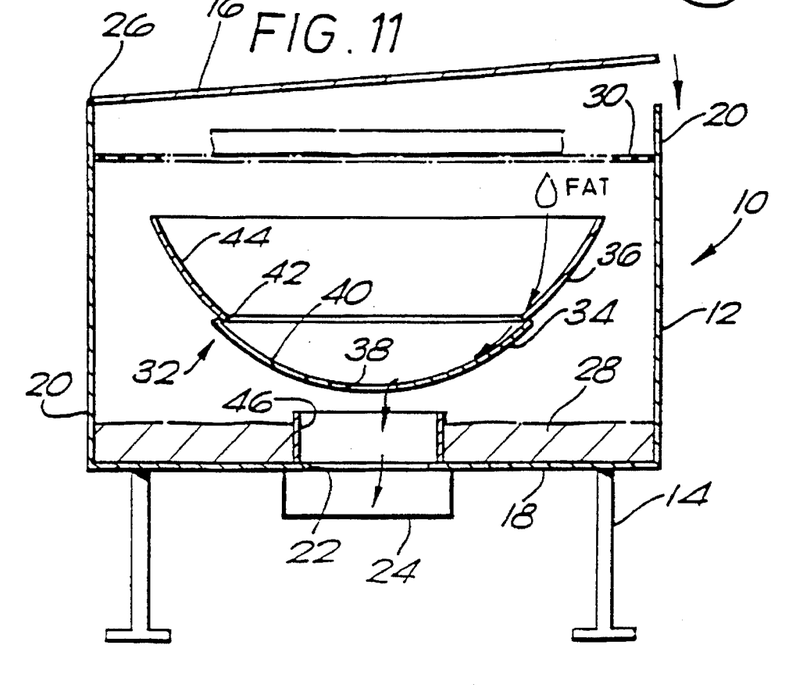
FIG. 11 is cross-sectional view of a cooking device in accordance with an eighth embodiment of the present invention.

In use fat and other drippings will fall from the food being cooked on to the baffle 32 and, as in the previous embodiments, will begin to drain under the influence of gravity towards the central opening 38. As before a certain amount of the fat and other drippings will be vapourised on contact with the baffle 32. The remaining drippings however are channelled to the central opening 38 from where they pass under the influence of gravity through the void region in the heat source 28 defined by the retaining wall 46, through the central aperture 22 and into the collecting receptacle 24.

Figure 12:
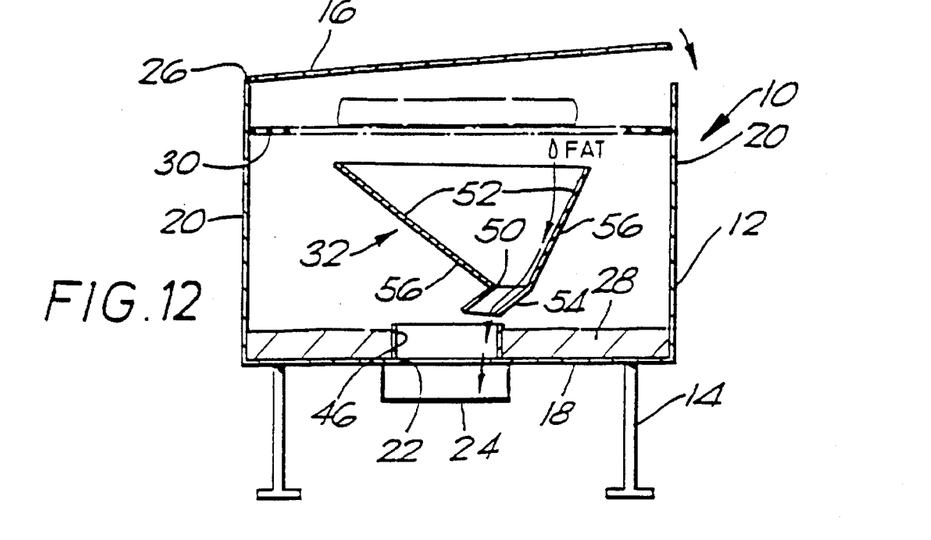
FIG. 12 is a cross-sectional view of a cooking device in accordance with a nineth embodiment of the present invention.

In another arrangement shown in FIG. 12, the baffle 32 is provided with an opening 50, no longer necessarily located centrally, but from which an upper surface of the baffle 52 is inclined upwardly. A depending wall 54 surrounds the opening 50 and is attached to an under surface of the baffle 56 to define a drain pipe. In such an arrangement the opening in the baffle 50 need no longer be in vertical alignment with a central aperture 22 in the base is since the drain pipe defined by the depending wall 54 may be somewhat inclined to the under surface of the baffle 56 whilst still performing its function of directing any drippings collected by the baffle 32 to the receptacle 24 without the drippings contacting the heat source 28.

In a related arrangement the drain pipe defined by the depending wall 54 may be extended to below the heat source 28 and adapted so as to be closed at an end remote from the opening 50. In this way the drain pipe may itself define the receptacle 24. This may be particularly advantageous in relation to charcoal type cooking devices since provided the drain pipe may pass through the charcoal or other combustable medium it would then not be necessary to provide the base 18 with a retaining wall 46 or the heat source 28 with a corresponding void region as described in relation to FIG. 11. In such an arrangement the closed end of the drain pipe may be provided with a tap to drain off the fat and other drippings collected therein.

Figure 13:
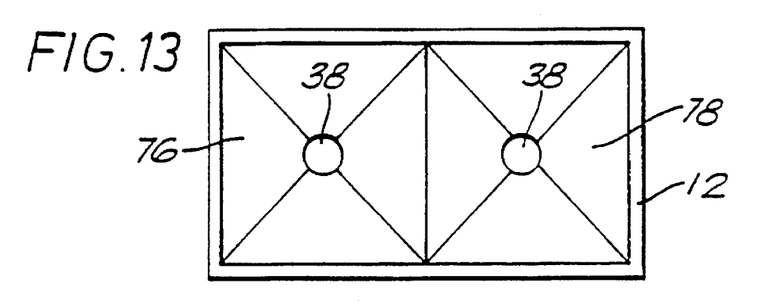
FIG. 13 is a plan view of a cooking device in accordance with a tenth embodiment of the present invention.
Figure 14:
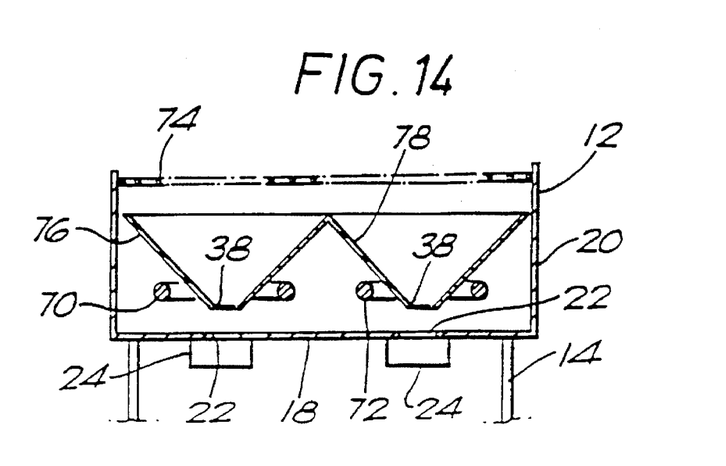
FIG. 14 is a cross-sectional view of the cooking device of FIG. 13.

Whilst the present invention has been described as comprising a single baffle 32 this need not necessarily be the case. Likewise, it will be apparent to those skilled in the art that the chamber 12 may be of any convenient shape as illustrated in FIGS. 1 to 12. A further example is illustrated in FIGS. 13 and 14 where there is shown a chamber 12 of generally rectangular cross-section containing two annular gas burners 70 and 72 disposed side by side and above which there is disposed a wire-grill 74. Interposed between the wire-grill 74 and each of the gas burners 70 and 72 there is provided a respective one of a pair of baffles 76 and 78, each of which may be in accordance with any of the preceding embodiments.

The advantage of a multiple baffle arrangement such as that shown in FIGS. 13 and 14 is that, not only does it facilitate the simultaneous cooking of a greater quantity of food, but also, if the baffles are of the two-piece construction shown in FIGS. 1 and 2, one of the baffles may be orientated so as to barbecue the food to be cooked while the other, with its outer baffle portion inverted, may be orientated so as to perform some other kind of cooking operation.

I claim:

1. An outdoor device for cooking food comprising:

a heat source arranged so as to extend over a predetermined area, said area including a void region comprising a substantially vertical hole through the heat source;

means for supporting food to be cooked above the heat source;

a baffle interposed between the heat source and said food supporting means, the baffle being located and shaped so as to prevent drippings from the food being cooked from falling onto the heat source; and means to channel the drippings through said void region to a region beneath the heat source, the baffle having regions thereof which are heated to a temperature sufficient to cause vaporization of some of the drippings with which the regions come into contact, said regions being inclined at an angle relative to horizontal within a range from approximately 30° to 70°.

2. A cooking device in accordance with claim 1, wherein a receptacle is disposed below said void region.

3. A cooking device in accordance with claim 2, wherein the receptacle is disposable.

4. A cooking device in accordance with claim 2, wherein the baffle is formed integrally with said receptacle.

5. A cooking device in accordance with claim 4, wherein the baffle is comprised of two or more components and the component which is formed integrally with the receptacle is adapted so as to be disposable.

6. A cooking device in accordance with claim 1, wherein the baffle includes an opening and is so shaped that drippings from the food being cooked falling on the baffle are directed toward the opening.

7. A cooking device in accordance with claim 6, wherein the baffle is provided with a depending wall surrounding said opening to define a path by which the drippings may be channeled without contacting the heat source.

8. A cooking device in accordance with claim 7, wherein said path defined by the depending wall is capable of being closed at an end remote from the opening so as to define a receptacle in which to collect the drippings.

9. A cooking device in accordance with claim 6, wherein the opening in the baffle is in vertical alignment with said void region.

10. A cooking device in accordance with claim 1, wherein means are provided to concentrate the heat generated by said heat source onto a selected region of said food supporting means.

11. A cooking device in accordance with claim 1, wherein the baffle is comprised of two or more components, at least one of said components being capable of being arranged so as to concentrate the heat generated by said heat source onto a selected region of said food supporting means.

12. An outdoor device for cooking food comprising:

a heat source;

means for supporting food to be cooked above the heat source; and a baffle interposed between the heat source and said food supporting means, the baffle being comprised of two or more components, at least one of said components being moveable so that in a first configuration the baffle is located and shaped so as to prevent drippings from the food being cooked from falling onto the heat source and in a second configuration the baffle is located and shaped so as to concentrate heat generated by the heat source onto a selected region of said food supporting means.

13. An outdoor cooking device comprising two or more independently controllable heat sources, means for supporting the food to be cooked above the heat sources, and a baffle interposed between the heat sources and said food supporting means, the baffle being located and shaped so as to both prevent drippings from the food being cooked from falling on to the heat sources and collect said drippings together above the heat sources, one of said sources being located so as to heat particularly a region of the baffle over which drippings are collected.

14. A cooking device in accordance with claim 13, wherein an upper surface of the baffle is inclined upwardly and away from the region over which the drippings are collected and the sources are arranged so as to heat different regions of said upper surface.

15. A cooking device in accordance with claim 13, wherein the baffle is substantially bowl shaped and the sources are arranged substantially coaxially.

16. A cooking device in accordance with claim 13, wherein the heat sources are substantially annular.

17. An outdoor cooking device comprising a heat source, means for supporting the food to be cooked above the heat source, and a baffle interposed between the heat source and said food supporting means, the baffle being located and shaped so as to both prevent drippings from the food being cooked from falling on to the heat source and collect said drippings together above the heat source, the heat source being moveable between a first position in which the source is capable of heating the food to be cooked and a second position in which in addition the source is capable of particularly heating a region of the baffle over which drippings are collected.

18. A cooking device in accordance with claim 17 and additionally comprising means to control the quantity of heat generated by the heat source.

19. A cooking device in accordance with claim 17, wherein the heat source is rotatable between said first and second positions.

20. A cooking device in accordance with claim 17, wherein the heat source comprises a gas burner.

* * * * *